June 22, 1948. T. Y. KORSGREN 2,443,707
HOT AIR HEATER WITH FUEL VAPORIZER AND AIR MIXER
Filed March 19, 1943
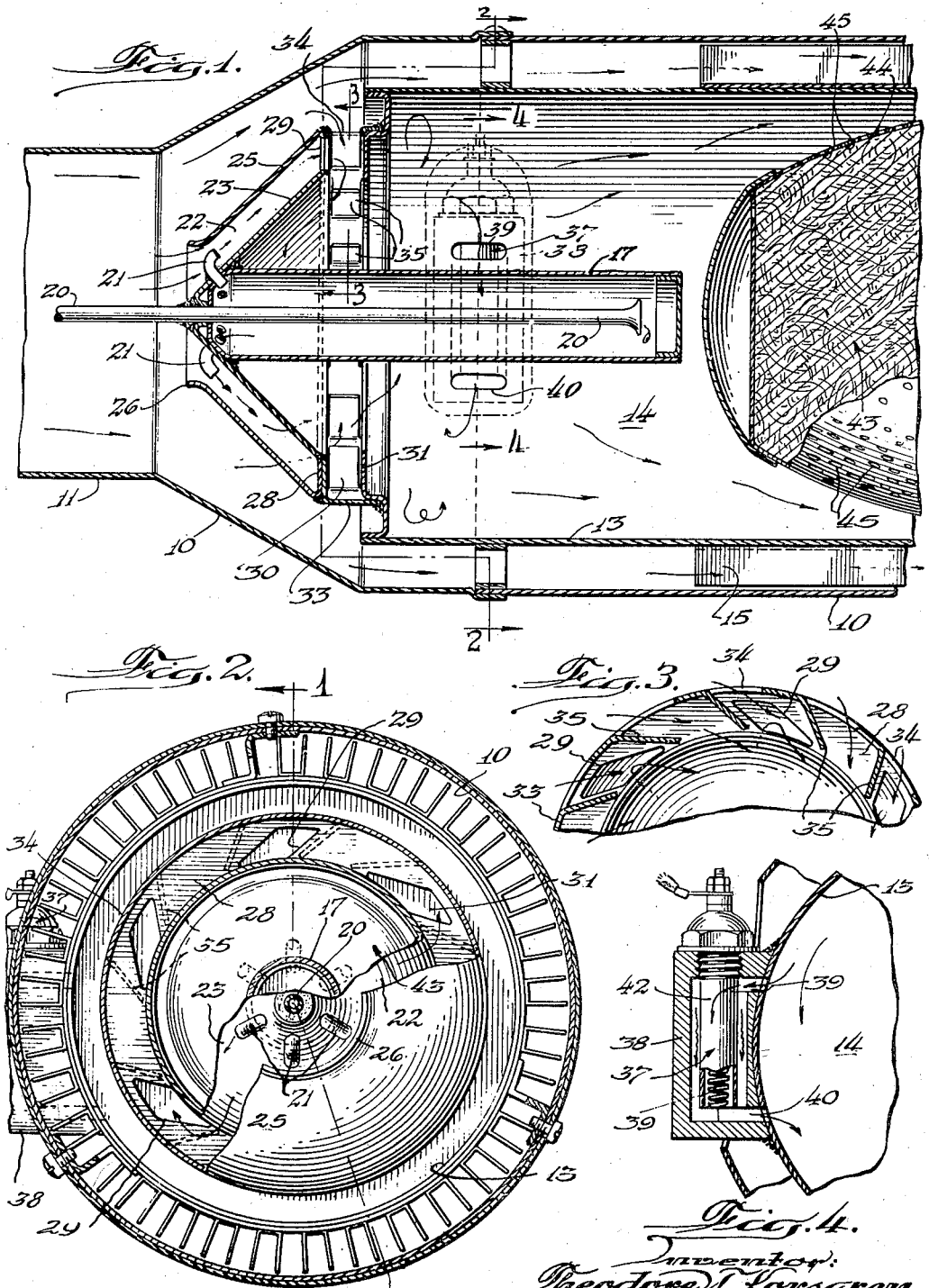
Inventor:
Theodore Y. Korsgren
By Williams, Bradbury & Hinkle
Attorneys Patented June 22, 1948

2,443,707

UNITED STATES PATENT OFFICE 2,443,707

HOT-AIR HEATER WITH FUEL VAPORIZER AND AIR MIXER

Theodore Y. Korsgren, Winnetka, Ill., assignor to Stewart-Warner Corporation, Chicago, Ill., a corporation of Virginia Application March 19, 1943, Serial No. 479,681

2 Claims. (Cl. 126—116)

My invention relates to heaters of a type in which fuel, preferably gasoline, is vaporized by heat, as distinguished from the type in which the fuel is atomized. The heater of my invention is intended primarily for use in heating compartments of airplanes and is arranged to receive a draft of air from a ram preferably placed in the slip stream of the airplane.

It has been common practice in the past either to conduct a combustible mixture of air and fuel from the intake passage of the airplane motor to the heater where it is ignited and burned in a combustion chamber from which the heat is exchanged to the air of the airplane cabin or else to conduct liquid fuel to the heater and there to atomize the fuel by means of a carbureting device, such as a Venturi tube in which the atomized fuel is mixed with air in the proper portions to burn, the combustion then taking place in the same manner as though the combustible mixture had been carried to the heater from the engine intake. The objections to the first of these methods are that the engines are deprived of a small amount of mixture and that a large pipe is required for carrying a sufficient mixture of fuel and air from the engine intake to the heater. Large pipes, particularly charged with a combustible mixture, are objectionable in airplanes because of the weight and because of the danger of explosion if the pipe becomes broken. The objection to the second method is that an extremely high velocity of air through the atomizing device is necessary to bring about good atomization. A sufficient velocity for that purpose cannot usually be had merely from an air ram in the slip stream, particularly if the pipe through which the air must be carried is a long one.

In accordance with my invention, a very small tube is sufficient to carry the fuel from the airplane's fuel tank to the heater and the velocity of air through the heater may be very much less than the velocity required to bring about good atomization.

In accordance with my invention, I locate a vaporizer axially within a combustion chamber in which the air and flame are caused to swirl about the exterior of the vaporizer to keep it heated to a high temperature. The liquid fuel is delivered to the vaporizer by means of a metallic tube which extends throughout the length of the vaporizer such that the fuel becomes heated almost to its vaporizing temperature before it emerges from the fuel delivery tube onto the walls of the very much hotter vaporizer. Fuel which has been vaporized in the vaporizer emerges into a mixer where it is mixed with air and thence passes to the combustion chamber where it is ignited. The discharge from the combustion chamber is carried outside the fuselage of the airplane where it is preferably turned rearwardly in a low pressure area, thus maintaining a pressure within the combustion chamber which is less than the pressure of the air conducted to the combustion chamber from the ram and insuring that there will be no escape of burnt gases into the air stream which passes into the airplane cabin.

One object of my invention is to provide a structure in which a heat operated fuel vaporizer supplies the vapor to be mixed with air within an internal combustion heater.

Another object of my invention is to provide means for preheating the liquid fuel before it comes in contact with the heated surfaces of the vaporizer.

Another object of my invention is to produce a whirling motion in the air and flame about the vaporizer to drive the hottest and therefore the lightest of the swirling contents of the combustion chamber into proximity or contact with the vaporizer.

Another object of my invention is to provide a structure in which the vaporized fuel is first mixed with an amount of air less than necessary to support rapid combustion, which mixture is heated to a high temperature so that when mixed with additional air to form a combustible mixture it ignites easily.

My invention is illustrated in the accompanying drawings in which:

Fig. 1 is a longitudinal section through the preferred embodiment of the combustion chamber portion of my heater;

Fig. 2 is a section taken on the line 2—2 of Fig. 1;

Fig. 3 is a section taken on the line 3—3 of Fig. 1; and

Fig. 4 is a section on the line 4—4 of the igniter of Fig. 1.

In the following specification like characters are used to designate the elements in the several views.

Referring first to the preferred embodiment of my invention, illustrated in Figs. 1 to 4 inclusive, a cylindrical housing 10 is connected by a pipe 11, preferably with a ram located in the slip stream of an airplane, so as to receive a flow of air to be used for both heating and ventilating one or more cabins of the airplane. The portion of the housing 10 broken away at the right of Fig. 1 leads to a discharge opening into a compartment or compartments of the plane to be heated. Concentrically located within the housing 10 is a thin-walled cylinder 13 enclosing a combustion chamber 14, the cylindrical wall 13 being provided with longitudinal fins 15 for conducting heat from the wall 13 to the space between that wall and the housing 10 to heat the air passing longitudinally along the space from the induction pipe 11 to the discharge into the plane compartment.

A vaporizer 17, preferably in the form of a cylinder, is supported from one end centrally within the cylindrical combustion chamber 14. A metallic fuel delivery pipe 20 extends into the vaporizer and substantially the whole length thereof but out of contact with the highly heated wall 17 of the vaporizer. This fuel delivery pipe is of such internal diameter that the fuel flows through it at the proper rate to be heated just short of its vaporizing temperature before it drops or flows from the end of the fuel pipe 20 onto the wall of the vaporizer.

Nozzles 21 protrude from the supporting end of the vaporizer for delivering vaporized fuel into a conical passageway 22 formed between the end 23 of the combustion chamber 14 and a substantially parallel metallic cone 25 having a flaring entrance 26 facing the stream of air which comes to the heater from the conduit 11. Since the inner cone 23 is maintained very hot from the combustion taking place in contact with its inner surface, the air and vapor passing along the conical passageway 22 between the cones 23 and 25 will expand at substantially the same rate that the conical passageway 22 expands, so that the velocity of air and vapor along the conical passageway will remain substantially constant. The space between the two cones 23 and 25 at their larger ends is closed by a perforated wall 28 in a plane which lies at right angles to the axis of the cones. As illustrated, this wall is provided with six apertures 29, leading into a circumferential passageway 30 formed between the wall 29 and a parallel wall 31 spaced apart a distance substantially equal to the distance between the cones 23 and 25. The circumferential passageway 30 is externally bounded by a cylindrical partition 33, having openings 34 therein formed by cutting and bending inwardly portions of the cylindrical partition 33, the bent inwardly portions 35 forming baffles to guide the combustible mixture passing through the apertures 29 and the air passing through the openings 34 radially inwardly. Even the amount of air which passes through the openings 34 which communicates with the apertures 29 does not form the mixture into fast burning proportions. It requires the additional air which enters through the openings 34 between the baffles 35, which space is in indirect communication with one of the apertures 29, to complete the mixture into one which will readily ignite. The final mixing of the air and vapor into proper combustible proportions takes place within the combustion chamber 14 as it swirls under the influence of the baffles 35.

All of the structure forming the entrance end of the combustion chamber 14 is preferably welded to the end of the cylindrical wall 13 of the combustion chamber. The conical shape of the members 23 and 25, parts of which become highly heated and parts of which remain comparatively cool, permits the uneven expansion of the metal without buckling and without throwing undue strains into the metal which might eventually cause crystallization and rupture.

The igniter 37, located within a metallic housing 38, preferably welded to the outside of the cylinder 13, is heated to a glowing temperature by means of an electric circuit from a suitable source of current not shown. The housing 38 is provided with upper and lower openings 39 and 40, communicating with the combustion chamber 14. As the combustible mixture in the combustion chamber circulates in a counterclockwise direction (Fig. 4), mixture passes through the opening 39 around the heated cylinder 42 where its rate of flow is sufficiently slackened to permit the mixture to be raised to an igniting temperature. The ignited mixture then passes into the combustion chamber 14 through the opening 40, setting fire to the swirling mixture within the combustion chamber. Since the mixture in the combustion chamber is somewhat stratified by reason of its being admitted in streams of air and rich mixture, combustion takes place throughout a very large portion of the combustion chamber. The highest temperature portion of the swirling flame, however, is directed toward the center of the combustion chamber, through the influence of centrifugal force which drives the cooler and therefore heavier portions of the contents of the combustion chamber toward the outside. This action brings the highest temperature adjacent the vaporizer 17, keeping it heated to an extremely high temperature throughout its length.

Notwithstanding the fact that the air and a rich mixture are combined throughout the entire volume of the combustion chamber, periodic and harmonic increases and decreases in the rate of combustion are set up in the combustion chamber and would build themselves into an objectionable roar except for the presence in the combustion chamber of muffler 43, provided with a shell 44 having a multiplicity of small openings 45 therein which serve to dampen the vibrations and prevent objectionable roar. The interior of the muffler 43 is filled with suitable heat resistant material, such as glass or metallic wool, which destroys all tendency to resonance within the body of the muffler. It is to be understood that the products of combustion do not flow into and out of the muffler in their general passage to the exhaust of the combustion chamber except in such minute quantities as are necessary to muffle or deaden vibrations brought about in the combustion chamber.

In the modification of my invention described, the discharge pipe for carrying off the gases from the combustion chambers is preferably turned rearwardly in a low pressure area outside the fuselage of the airplane, so that pressure within the combustion chamber is constantly maintained at less than the pressure in the passage between the combustion chamber and the outer shell of the heater, thus preventing any leakage of burnt gases from the combustion chamber to the air stream which passes into the airplane cabin.

While I have shown and described a preferred embodiment of my invention it will be readily understood by those skilled in the art that variations may be made in the construction disclosed without departing from the basic features of my invention. I therefore do not wish to be limited to the precise construction disclosed, but wish to include within the scope of my invention all such modifications and variations which fall within the scope of the appended claims.

Having thus described my invention, what I claim as new and useful and desire to secure by Letters Patent of the United States is:

1. In an internal combustion heater, a substantially cylindrical shell forming a combustion chamber, a substantially cylindrical heater shell surrounding the combustion chamber, radiating fins in contact with the combustion chamber shell and extending into the space between the combustion chamber shell and the heater shell, a cylindrical heat operated vaporizer extending into and positioned along the axis of the combustion chamber provided with vapor openings leading therefrom, means to deliver liquid fuel into said vaporizer in a position remote from the vapor openings leading therefrom, means forming an air induction compartment having a wall common with the wall of said combustion chamber, said compartment expanding in size from an entrance to its discharge, the vapor openings from said vaporizer discharging into said compartment near the entrance thereof to form an air-fuel mixture, means forming passageways leading from the discharge of said compartment into the combustion chamber including means directing the mixture in a plane normal to the axis of the combustion chamber and at an acute angle to the shell of the combustion chamber.

2. In an internal combustion heater, a combustion chamber having a substantially cylindrical shell, a heater housing surrounding the combustion chamber forming a passageway therebetween for heating air passing lengthwise along the substantially cylindrical combustion chamber, a vaporizer within the combustion chamber, a conical end wall for the combustion chamber in heat communication with the vaporizer and with the interior of the combustion chamber, means to direct vapor from the vaporizer along said conical wall from a position near its apex to its base and thence into the combustion chamber, means to direct a limited quantity of air along said conical wall in mixing contact with the vapors, and additional means for admitting air into the combustion chamber and for directing it spirally therein in contact with the mixture of vapor and a limited amount of air, whereby the mixture in the combustion chamber will be caused to swirl about the axis of the combustion chamber.

THEODORE Y. KORSGREN.

REFERENCES CITED

The following references are of record in the file of this patent:

UNITED STATES PATENTS

| Number | Name | Date |
| --- | --- | --- |
| 492,718 | Edwards | Feb. 28, 1893 |
| 534,040 | Giles | Feb. 12, 1895 |
| 934,616 | Lindley | Sept. 21, 1909 |
| 1,026,664 | Fesler | May 21, 1912 |
| 1,815,317 | Klein | July 21, 1931 |
| 2,036,726 | Souter | Apr. 7, 1936 |
| 2,097,255 | Saha | Oct. 26, 1937 |

FOREIGN PATENTS

| Number | Country | Date |
| --- | --- | --- |
| 311,967 | Italy | Oct. 16, 1933 |